Patented Aug. 9, 1938

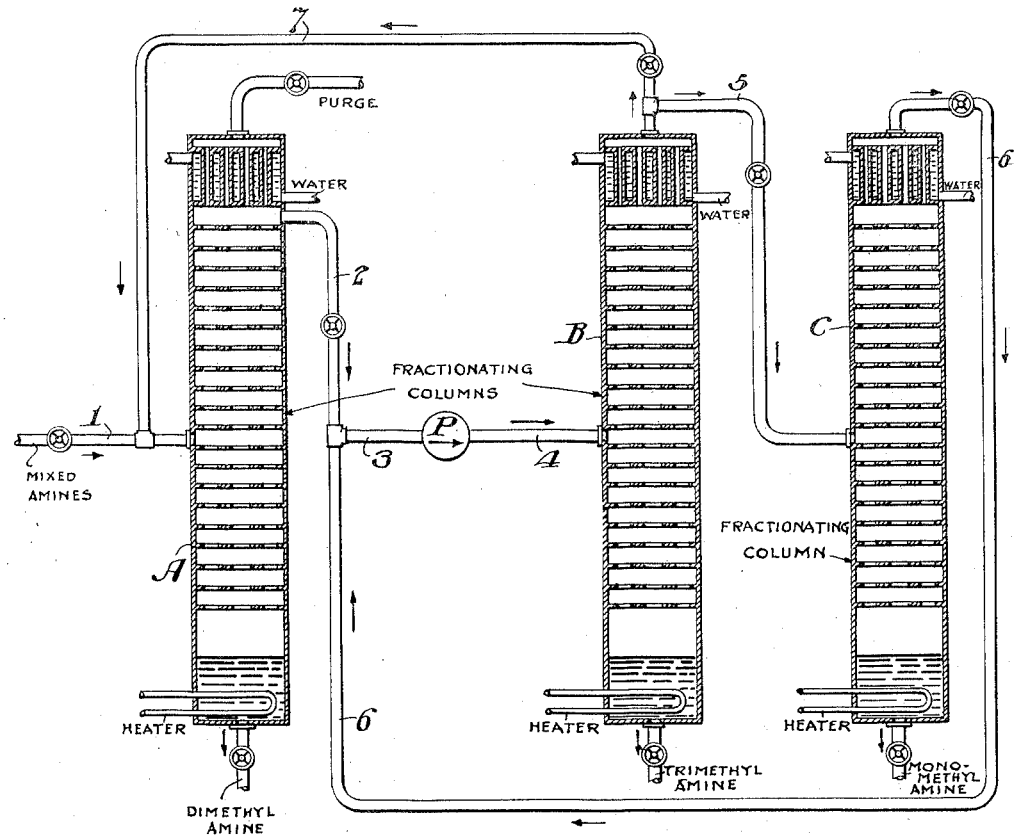

2,126,600

UNITED STATES PATENT OFFICE 2,126,600

SEPARATION OF METHYLAMINES

Chester E. Andrews, Overbrook, and Le Roy U. Spence, Cheltenham, Pa., assignors to Rohm & Haas Company, Philadelphia, Pa.

Application April 18, 1936, Serial No. 75,122

14 Claims. (Cl. 202—42)

This invention relates to a process for the separation of monomethylamine, dimethylamine and trimethylamine from their mixtures, particularly from the mixtures obtained in the catalytic preparation of methylamines.

The product obtained when methanol and ammonia are passed at suitable temperatures over an amination catalyst, after removal of high boiling materials, such as water, methanol and formaldehyde, consists of a mixture of ammonia, monomethylamine, dimethylamine and trimethylamine. A number of methods for separating this mixture have been suggested. If the mixture is distilled, the ammonia may be removed as a constant boiling mixture with trimethylamine and if sufficient ammonia is added, the trimethylamine may be completely removed with the ammonia. With the trimethylamine removed, the monomethylamine and dimethylamine may be separated by distillation. A disadvantage of this method is that it requires large quantities of ammonia and makes necessary a separate process for recovering it from the constant boiling mixture formed.

Another method for the removal of ammonia consists in adding dimethyl ether to the mixed amines and distilling to separate the ammonia as a constant boiling mixture with dimethyl ether. The three methylamines are thus obtained free from ammonia but their separation one from the other is complicated by the formation of constant boiling mixtures of monomethylamine and trimethylamine and by the fact that dimethylamine and trimethylamine boil at very nearly the same temperature. These difficulties have prevented the efficient separation of the methylamines by distillation.

An object of this invention is to provide a practical method for the separation of monomethylamine, dimethylamine and trimethylamine from their mixtures. Another object is to provide a method of separating dimethylamine from trimethylamine. A further object is to separate monomethylamine and trimethylamine from each other in mixtures containing no dimethylamine.

In our prior application, Serial No. 538,262 filed May 18, 1931, now Patent No. 2,061,889 granted November 24, 1936, of which this application is in part a continuation, we have shown that monomethylamine and trimethylamine form a constant boiling mixture which can be utilized to separate trimethylamine from dimethylamine. We have now further found that the composition of the constant boiling monomethylamine-trimethylamine mixture varies if the distillation is conducted at different pressures. We have found that the mixture obtained by distillation at atmospheric pressure contains about 30% by weight of trimethylamine and that as the distilling pressure is increased the trimethylamine concentration decreases until at 60 lbs. gauge it is about 15% and at 210 lbs. gauge about 7%.

In the present invention we utilize our discovery that monomethylamine and trimethylamine form a constant boiling mixture to separate them from dimethylamine, and then by re-distilling the mono-tri mixture at different pressures, separate it into its components. Essentially, our process consists in first removing ammonia from the mixed amines, then fractionating them to separate trimethylamine and monomethylamine from dimethylamine, and finally by cycling the mixed mono- and tri- fraction through two fractionating columns, one of which is operated at a relatively high pressure as compared with the other, separate the mono-amine from the tri-.

The mixture of amines used as the starting material may be obtained from either a catalytic or non-catalytic process of manufacturing methylamines. The ammonia is removed by any suitable method, such as by distilling with dimethyl ether. Preferably it is distilled out with part of the trimethylamine and returned to the reaction chamber for further reaction with methanol.

If in the mixture of amines to be separated, the ratio of trimethylamine to monomethylamine exceeds that of the constant boiling mixture, the proportion of the monomethylamine must be increased so that all the trimethylamine can be removed. This may be done by the addition of pure monomethylamine or by the addition of an amine mixture rich in monomethylamine obtained as hereinafter described. If the monomethylamine present exceeds the amount necessary for the constant boiling mixture, the excess may be removed along with the mixture by suitably adjusting the operation of the column.

To further explain our invention, reference will be made to the accompanying drawing which schematically illustrates suitable apparatus for carrying out our process.

In the drawing, letters A, B and C represent fractionating columns that are connected as indicated by pipes 1 to 7. Letter P represents a pump that forces the distillate from columns A and C into the high pressure column B.

In the operation of this apparatus the mixture of amines prepared by the catalytic amination of alcohol or any other process, after the removal of high boiling materials and ammonia, is conducted through pipe 1 to fractionating column A where it is separated into a residual portion consisting of substantially pure dimethylamine and a distillate portion containing practically all the monomethylamine and trimethylamine. Pressure in this column should be maintained as low as expedient, for as explained above, the lower the distilling pressure the greater the concentration of trimethylamine in the constant boiling mixture evolved. We have found a distilling pressure of 60 pounds gauge to be convenient, for at lower pressures artificial refrigeration must be resorted to to condense the vapors.

The distillate from column A passes through pipes 2 and 3, pump P, and pipe 4 to fractionating column B in which it is again subjected to a fractional distillation, this time under a relatively high pressure. While the specific pressure maintained in column B is not critical, we have found an operating pressure of 210 pounds' gauge convenient when the pressure in column A is maintained at 60 pounds. By maintaining a high pressure in column B the composition of the constant boiling monomethylamine-trimethylamine fraction that is vaporized is altered so that it contains a substantially lower proportion of trimethylamine. The remaining trimethylamine is drawn off at the bottom of the column.

The distillate from column B passes through pipe line 5 to column C, and is again fractionated at a low pressure, conveniently 60 pounds' gauge. The low pressure in this column again alters the composition of the constant boiling monomethylamine-trimethylamine mixture, so that the distillate coming off has substantially the same composition as that coming from column A. The excess monoamine is withdrawn from the bottom of the column. The distillate from column C is drawn off through pipe 6, mixed with the distillate from column A and returned through pipe 3, pump P and pipe 4 to the high pressure distilling column B.

The pipe line 7 connecting the top of fractionating column B and the entrance to column A is provided to permit the recirculation of the mixture high in monomethylamine evolved from column B back to column A. In this way the relative concentration of monomethylamine and trimethylamine in the initial mixture may be suitably adjusted to insure the presence of sufficient monomethylamine to vaporize in column A all the trimethylamine as a constant boiling mixture. Where the composition of the initial mixture is such that the addition of more mono is unnecessary, the recirculation of distillate through pipe 7 is unnecessary. It will be apparent that where the ratio of mono to tri in the initial mixture is very high, the distillate from column A will likewise be high in monomethylamine. Under such operating conditions, it may be desirable to reverse the order in which the mono and tri are removed, by passing the distillate from column A first through column C and then through column B.

The distillation temperatures maintained in the three columns will depend entirely upon the pressure at which they are operated, and while we have indicated a preference for an operating pressure of about 60 pounds' gauge in columns A and C and of about 210 pounds' gauge in column B, other pressures can be chosen to obtain the same result, so long as the pressure in column B is maintained above that used in columns A and C.

By means of our process a mixture of methylamines containing 59.6% monomethylamine, 28.0% dimethylamine and 12.4% trimethylamine, can be separated into 97% pure dimethylamine, better than 96% pure trimethylamine and 98% pure monomethylamine. This is accomplished by mixing with the initial amine mixture an equal amount of distillate from column B and maintaining gauge pressures of 60 lbs. per sq. in. in columns A and C and 210 lbs. per sq. in. in column B. The temperatures in the three columns were 36° C. at the top of column A and 54° C. at the bottom; 76° C. at the top of column B and 103° C. at the bottom; 36° C. at the top of column C and 37° C. at the bottom.

We have described our invention as a complete continuous process for the separation of all three methylamines, but it is apparent that it can be carried out as a batch process and also that the various steps can be utilized as such where it is desired to separate a single or only two of the components. Thus, the steps of adding monomethylamine to the initial mixture and distilling, can be utilized to obtain pure dimethylamine without subsequently separating the mono from the tri. Also, if dimethylamine and trimethylamine are the only desired components, the low pressure distillation in column C can be omitted. The monoamine rich distillate from column B can then, if desired, be reacted with more methanol to convert it to the higher amines. Furthermore, if pure monomethylamine is the desired component, the fractionation in column A can be omitted and both dimethylamine and trimethylamine separated in column B. It is to be understood that our invention comprises the various steps of our process as well as the complete combination.

It will also be apparent that our process lends itself to various modifications to adapt it to specific operating requirements. Thus, where the mixture of amines to be separated contains noncondensable gases, it is desirable to provide a means for removing these from the system, preferably in the reflux condenser of column A. Or, if the mixture of amines fed to column A contains some high boiling materials, such as methanol and water, these may be removed with the dimethylamine from the bottom of the column, and later removed by a subsequent distillation. Other similar modifications can be resorted to without departing from the scope of the present invention as defined in the following claims.

We claim:

1. In the process of separating dimethylamine from a mixture of methylamines from which ammonia has been removed the steps of adding to the mixture monomethylamine and distilling to remove the trimethylamine in a constant boiling monomethylamine-trimethylamine mixture.

2. The process of separating dimethylamine from its mixtures with trimethylamine from which ammonia has been removed which comprises adding to the mixture sufficient monomethylamine to remove the trimethylamine in a constant boiling monomethylamine-trimethylamine mixture and distilling.

3. The process of separating a purified dimethylamine and a purified trimethylamine from a mixture of methylamines from which ammonia has been removed which comprises adjusting the monomethylamine concentration of the mixture to permit the removal of trimethylamine in a constant boiling monomethylamine-trimethylamine mixture, distilling to remove the monomethylamine and trimethylamine, and redistilling the mixture of monomethylamine and trimethylamine under a higher pressure to separate part of the trimethylamine.

4. The process of separating a purified dimethylamine and a purified trimethylamine from a mixture of methylamines from which ammonia has been removed which comprises adjusting the monomethylamine concentration of the mixture to permit the removal of trimethylamine in a constant boiling monomethylamine-trimethylamine mixture, distilling under about 60 pounds' gauge pressure to remove the monomethylamine and trimethylamine, and redistilling the mixture of monomethylamine and trimethylamine under about 210 pounds' gauge pressure to separate part of the trimethylamine.

5. The process of separating methylamines containing sufficient monomethylamine to remove all the trimethylamine in a constant boiling monomethylamine-trimethylamine mixture which comprises separating any ammonia present distilling to remove the monomethylamine and trimethylamine, and redistilling the mixture of monomethylamine and trimethylamine under a higher pressure to separate part of the trimethylamine.

6. The process of separating a mixture of methylamines from which ammonia has been removed which comprises adjusting the monomethylamine concentration of the mixture to permit the removal of trimethylamine in a constant boiling monomethylamine-trimethylamine mixture, distilling to remove the monomethylamine and trimethylamine, redistilling the mixture of monomethylamine and trimethylamine under a higher pressure to remove part of the trimethylamine and redistilling the distillate thus obtained under a pressure not as high to remove a part of the monomethylamine.

7. The process of separating a mixture of methylamines from which ammonia has been removed which comprises adjusting the monomethylamine concentration of the mixture to permit the removal of trimethylamine in a constant boiling monomethylamine-trimethylamine mixture, distilling under about 60 pounds' gauge pressure to remove the monomethylamine and trimethylamine, redistilling the mixture of monomethylamine and trimethylamine under about 210 pounds' gauge pressure to remove part of the trimethylamine and redistilling the distillate thus obtained under about 60 pounds' gauge pressure to remove a part of the monomethylamine.

8. The process of separating methylamines containing sufficient monomethylamine to remove all the trimethylamine in a constant boiling monomethylamine-trimethylamine mixture which comprises separating any ammonia present distilling to remove the monomethylamine and trimethylamine, redistilling the mixture of monomethylamine and trimethylamine under a higher pressure to remove part of the trimethylamine and redistilling the distillate thus obtained under a pressure not as high to remove a part of the monomethylamine.

9. The process of separating methylamines containing sufficient monomethylamine to remove all the trimethylamine in a constant boiling monomethylamine-trimethylamine mixture which comprises separating any ammonia present distilling under about 60 pounds' gauge pressure to remove the monomethylamine and trimethylamine, distilling the mixture of monomethylamine and trimethylamine under about 210 pounds' gauge pressure to remove part of the trimethylamine and redistilling the distillate thus obtained under about 60 pounds' gauge pressure to remove a part of the monomethylamine.

10. The process of separating a mixture consisting essentially of monomethylamine and trimethylamine which comprises fractionating the mixture at one pressure and then fractionating the distillate obtained at a different presure, the difference in the fractionating pressures being sufficient to change the composition of the constant boiling monomethylamine-trimethylamine mixture.

11. The process of separating purified monomethylamine from a mixture of methylamines from which ammonia has been removed which comprises fractionating at one pressure to separate monomethylamine and part of the trimethylamine from dimethylamine, and then fractionating the distillate at lower pressure to separate part of the monomethylamine.

12. The process of separating a mixture consisting essentially of monomethylamine and trimethylamine which comprises fractionating the mixture under one pressure to separate a part of trimethylamine and then fractionating the distillate under lower pressure.

13. The process of separating a mixture consisting essentially of monomethylamine and trimethylamine which comprises fractionating the mixture under about 210 pounds' gauge pressure to separate a part of trimethylamine and then fractionating the distillate under about 60 pounds' gauge pressure.

14. The process of separating a mixture consisting essentially of monomethylamine and trimethylamine which comprises fractionating the mixture under one pressure to separate part of the monomethylamine, and then fractionating the distillate under higher pressure to separate part of the trimethylamine.

CHESTER E. ANDREWS.
LE ROY U. SPENCE.